United States Patent [19]

Ohtani et al.

[11] Patent Number: 4,795,792
[45] Date of Patent: Jan. 3, 1989

[54] PROCESS FOR PREPARING PARTICLES OF OLEFIN-MALEIC ANHYDRIDE COPOLYER

[75] Inventors: Shoji Ohtani, Funabashi; Yoshiyuki Muroi; Rikio Tsushima, both of Wakayama, all of Japan

[73] Assignee: Kao Corporation, Tokyo, Japan

[21] Appl. No.: 187,261

[22] Filed: Apr. 28, 1988

[30] Foreign Application Priority Data

May 25, 1987 [JP] Japan ................................. 62-127641

[51] Int. Cl.$^4$ ................................................ C08F 2/08
[52] U.S. Cl. ...................................... 526/201; 526/272; 524/530; 524/531; 525/279; 525/285
[58] Field of Search ................ 526/201, 272; 525/279, 525/285; 524/530, 531

[56] References Cited

U.S. PATENT DOCUMENTS

Re. 28,475   7/1975   Blecke et al. ......................... 526/272
4,048,425   9/1977   Sackmann et al. ................... 526/272

Primary Examiner—C. Warren Ivy
Assistant Examiner—Alex H. Walker
Attorney, Agent, or Firm—Flynn, Thiel, Boutell & Tanis

[57]             ABSTRACT

A copolymer of an olefin and maleic anhydride is produced in the form of particles by co-polymerizing an olefin having 2 to 8 carbon atoms with maleic anhydride in a solvent capable of dissolving both co-monomers, but incapable of dissolving the copolymer in the presence of a dispersant of an oil-soluble, cationic copolymer comprising (a) ethylenically unsaturated monomer units having cationic groups of a quaternary ammonium salt and (b) lipophilic, ethylenically unsaturated monomer units. It has a relatively uniform particle size distribution 3 Claims, No Drawings

PROCESS FOR PREPARING PARTICLES OF OLEFIN-MALEIC ANHYDRIDE COPOLYER

The present invention relates to a process for preparing particles of an olefin-maleic anhydride copolymer and more particularly to a process for preparing particles of a copolymer of an olefin having 2 to 8 carbon atoms with maleic anhydride useful as an adhesive, a dispersant, an emulsion stabilizer, a binder, an admixture for cement, etc. in the form of primary particles having a spherical shape and a uniform particle size and diameter.

[PRIOR ART]

A copolymer of a lower olefin with maleic anhydride is used for applications such as an adhesive for wood and paper, a paint, a binder for a paint or an ink, a dispersant for an inorganic pigment, a stabilizer for emulsion polymerization, and an admixture for cement. It is particularly useful as an additive for maintaining the flowability of cement for a long period of time, i.e., as a slump loss preventive.

As described in Japanese Patent Laid-Open No. 16851/1985, the addition of a copolymer of an olefin having 2 to 8 carbon atoms with maleic anhydride to a cement mixture enables not only the cement mixture to be kept flowable for a long period of time but also the flowability of the cement mixture to be kept constant, which contributes to a remarkable improvement in workability of the cement mixture. The cement particles in the cement mixture are chemically agglomerated due to the hydration thereof and physically agglomerated due to the interparticle attraction and gradually lose the flowability. When the above-described copolymer is previously added to the cement mixture, the copolymer is hydrolyzed with an alkali oozing from the cement, which makes the copolymer water-soluble. Therefore, the copolymer is gradually dissolved in water from the surface of the polymer particle (gradual release action) and exhibits the cement dispersing properties, thus maintaining the flowability of the cement mixture for a long period of time.

In this method, the most important factor for preventing the slump loss of the cement mixture is a balance between the rate of the slump loss caused by the chemical and physical agglomerations of the cement particles and the rate of the hydrolysis of the copolymer of an olefin having 2 to 8 carbon atoms with maleic anhydrid..

The rate of hydrolysis of the copolymer varies depending upon the molecular weight and the particle diameter. The molecular weight of the copolymer useful as the slump loss preventive is preferably 500 to 20,000. The particle diameter is preferably 0.1 to 1,000 $\mu$m, particularly preferably 0.1 to 10 $\mu$m.

However, it is difficult to prepare the copolymer of an olefin having 2 to 8 carbon atoms with maleic anhydride having the above-described particle diameter by an ordinary method. The copolymer is usually prepared in the form of an agglomerate or a lump having a particle diameter of 20 $\mu$m to several millimeters. Therefore, the agglomerate or the lump should be finely divided by wet or dry pulverization to have a desired particle diameter. However, the pulverization for attaining such a particle diameter requires much energy even when the pulverization is efficiently conducted with, e.g., a wet sand mill, which leads to an increase in the production cost. Further, the copolymer particles prepared by the pulverization method have irregular shapes and a very broad particle diameter distribution, which makes it difficult to control the above-described rate of gradual release at a constant value. Moreover, when the copolymer particles to use as an additive are stored in the form of a water slurry, the particles having larger particle size settle down. This unfavorably renders the quality of the product non-uniform.

For this reason, copolymer particles having a uniform shape (e.g., a spherical shape) and a narrow particle diameter distribution is desired.

Heretofore, many proposals have been made on precipitation polymerization with respect to a process for preparing an olefin-maleic anhydride copolymer. This process comprises conducting a polymerization in a solvent capable of dissolving the comonomers but incapable of dissolving the resulting polymer to prepare a polymer in the form of a powder, a particle, or a lump. Examples of the solvent include lower ketones such as acetone and methyl ethyl ketone, lower esters such as methyl acetate, ethyl acetate, isopropyl acetate, and methyl propionate, aromatic solvents such as benzene, xylene, toluene, ethylbenzene, n- or tert-butylbenzene, and isopropylbenzene, hydrocarbon solvents such as hexane and ligroin, and any mixture thereof.

In the inventors' study, the precipitation polymerization using these solvents only was found to have the following drawbacks. Specifically, when lower ketones, such as acetone, were used as the solvent, the solvent dissolved part of the resulting copolymer because of the high polarity of the solvent itself. This resulted in a low yield, a large amount of a deposit on the wall of a reactor, and the formation of irregular agglomerates having a size of 30 $\mu$m to hundreds of $\mu$m.

Further, the use of ester solvents, such as isopropyl acetate and butyl acetate, as described in Japanese Patent Publication No. 6396/1974 and Japanese Patent Laid-Open No. 91208/1986 also caused the formation of a large amount of a deposit on the wall of the reactor. In this case, when an attempt was made to prepare a copolymer having an average molecular weight of 100 000 or more, particles having a diameter of about 1 $\mu$m were formed. However, the decrease in the molecular weight of the copolymer to 50000 or less brought about disintegration of the particle shape and led to the formation of irregular agglomerates.

Further, the use of aromatic solvents, such as ethylbenzene, as described in Japanese Patent Laid-Open No. 99110/1985 reduced the amount of the deposit on the wall of the reactor by virtue of the lowering in the solubility of the copolymer. However, the resulting copolymer was in the form of irregular agglomerates having a particle diameter of 20 to 50 $\mu$m and therefore required the pulverization thereof for use in the above-described applications.

Moreover, when hydrocarbon solvents, such as hexane, were used, it was impossible to conduct homogeneous polymerization because maleic anhydride remained undissolved. The reaction in the form of a heterogeneous phase brought about the formation of a massive polymer which was difficult to handle.

Besides these, a process in which a mixed solvent is used has been proposed (see Japanese Patent Publication No. 16551/1974). However, in this process, it is difficult to prepare a copolymer in the form of a primary particle.

Another proposal was made, showing that a solvent containing a dispersant be used in the precipitation polymerization. Japanese patent publication B No. 5927/1987 shows use of a copolymer of an alpha-olefin having at least 20 carbon atoms with maleic anhydride. The Japanese patent publication A No. 95489/1976 proposes use of a half ester or a half amide of a copolymer of an alpha-olefin having 2 to 8 carbon atoms with maleic anhydride. The processes using those dispersants each decrease the amount of the deposit on the wall of the reactor. However, the formed copolymer has a particle diameter of 10 μm to tens of μm, and these processes are unable to prepare a copolymer consisting of only finely divided particles having a particle diameter of 10 μm or less.

(SUMMARY OF THE INVENTION)

An object of the present invention is to provide a process for preparing a copolymer of a lower olefin with maleic anhydride in the form of primary particles which have a spherical shape and a monodisperse particle size distribution without formation of any agglomerate and also have a particle size of about 10 microns or less.

Another object of the invention is to prevent the copolymer in the precipitation polymerization from deposition on reactor walls, an agitating blade and other equipment involved and eventually improve the yield of the intended copolymer.

All the references hereinafter to "particle diameter" means the particle size.

The present inventors have made extensive and intensive studies with a view to solving the above-described problems. As a result, the present inventors have surprisingly found that the precipitation polymerization conducted in the presence of a particular dispersant in the radical polymerization of an olefin having 2 to 8 carbon atoms with maleic anhydride not only enables the formation of spherical particles of the copolymer in the form of primary particles having a substantially monodisperse particle diameter distribution without causing the formation of an agglomerate but also causes little or no deposition of the copolymer on the wall of the reactor, agitating blade, etc., thus enabling the preparation of the copolymer in a high yield, which has led to the completion of the present invention.

In accordance with the present invention, there is provided a process for preparing particles of an olefin-maleic anhydride copolymer which comprises copolymerizing an olefin having 2 to 8 carbon atoms with maleic anhydride, characterized in that a radical polymerization is conducted in a solvent capable of dissolving said comonomers but incapable of dissolving the resulting copolymer in the presence of an oil-soluble cationic copolymer comprising an ethylenically unsaturated monomeric unit having a cationic group represented by the following general formula (I):

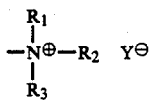

wherein $R_1$, $R_2$, and $R_3$ are each an alkyl or substituted alkyl group having 1 to 22 carbon atoms, provided that said three substituents may be the same or different and two of said substituents may be combined to form a cyclic structure together with a nitrogen atom adjacent thereto, and Y a halogen or an acid residue, and an ethylenically unsaturated monomeric unit having a lipophilic nature.

A copolymer of an olefin and maleic anhydride is produced in the form of particles by co-polymerizing an olefin having 2 to 8 carbon atoms with maleic anhydride in a solvent capable of dissolving both co-monomers, but incapable of dissolving the copolymer in the presence of a dispersant of an oil-soluble, cationic copolymer comprising (a) ethylenically unsaturated monomer units having cationic groups of the formula (I):

in which $R_1$, $R_2$ and $R_3$ each are an alkyl having 1 to 22 carbon atoms or a substituted alkyl having 1 to 22 carbon atoms or two of $R_1$, $R_2$ and $R_3$ form a cyclic structure in combination with the nitrogen atom and Y is a halogen or an acid residue, and (b) lipophilic, ethylenically unsaturated monomer units.

It is preferable that the dispersant copolymer comprises the (a) units and (b) units at a mole ratio ranging from 30/70 to 1/99.

Examples of the olefin having 2 to 8 carbon atoms used in the present invention include ethylene, propylene, isobutylene, 1-butene, 2-butene, 1-pentene, 2-pentene, 1-hexene, cyclopentene, 2-methyl-1-butene, cyclohexene, 2-methyl-1-pentene, 3-methyl-1-pentene, 4-methyl-1-pentene, 2-ethyl-1-butene, diisobutylene, and any mixture thereof. Isobutylene is particularly preferable.

In the present invention, the molar ratio of the olefin having 2 to 8 carbon atoms to maleic anhydride is preferably ½ to 2/1. However, it is preferred that the olefin having 2 to 8 carbon atoms be used in a slight excess.

In the present invention, examples of the solvent capable of dissolving maleic anhydride and the above-described olefin but incapable of dissolving the formed copolymer include aromatic solvents such as benzene, xylene, toluene, ethylbenzene, n- or tert-butylbenzene, and isopropylbenzene and lower ester solvents such as methyl acetate, ethyl acetate, isopropyl acetate, and methyl propionate. They are used alone or in the form of any mixture thereof. Alkylbenzenes, such as toluene, isopropylbenzene, and ethylbenzene, are particularly preferable. It is preferred that the solvent be used in such an amount that the concentration of the formed copolymer is 5 to 35% by weight.

In the present invention, the ethylenically unsaturated monomer having a cationic group represented by the general formula (I) can be prepared by various known methods. For example, such a monomer can be prepared by quaternizing a monomer having a tertiary amino group with a suitable quaternizing agent.

Examples of the monomer having a tertiary amino group include dialkylaminoalkyl acrylates such as dimethylaminomethyl acrylate, dimethylaminoethyl acrylate, dimethylaminopropyl acrylate, diethylaminomethyl acrylate, diethylaminoethyl acrylate, and diethylaminopropyl acrylate and methacrylates corresponding thereto; dialkylaminoalkylacrylamides such as dimethylaminomethylacrylamide, dimethylamoniethylacrylamide, dimethylaminopropylacrylamide, diethylaminomethylacrylamide, diethylamonoethylacrylamide, and diethylaminopropylacrylamide and methastybamides corresponding thereto; vinylpyridines such as 4-vinylpyridine, 2-methyl-5-vinylpyridine and 2-ethyl-5-vinylpyridine; and styrenes having a dialkylamino group, such as N,N-dimethylaminostyrene and N,N-dimethylaminomethylstyrene.

Examples of the quaternizing agent for quaternizing the above-described monomer having a tertiary amino group include alkyl halides (wherein the alkyl group has 1 to 22 carbon atoms) such as methyl chloride, methyl bromide, methyl iodide, ethyl chloride, ethyl bromide, propyl bromide, butyl bromide, and octyl bromide; alkyl esters (wherein the alkyl group has 1 to 22 carbon atoms) of alkylsulfonic acids or arylsulfonic acids, such as methanesulfonic acid, benzenesulfonic acid, and toluenesulfonic acid; and dialkyl sulfates (wherein the alkyl group has 1 to 4 carbon atoms) such as dimethyl sulfate and diethyl sulfate.

Beside the above-described method in which these general quaternizing agents are used, it is possible to use a quaternization method which comprises converting the above-described monomer having a tertiary amino group into an acid salt thereof, such as hydrochloride or acetate, and reacting the acid salt with an alkylene oxide, such as ethylene oxide or propylene oxide.

In the formula (I) for the cationic group, the alkyl for R1, R2 and R3 includes methyl, ethyl, propyl, isopropyl, butyl, isobutyl, t-butyl, n-hexyl, 2-ethylhexyl, n-octyl, lauryl, myristyl, palmityl and stearyl. The substituent of the substituted alkyl for R1, R2 and R3 includes hydroxyl, an alkoxy, carboxyl, an aryl and a halogen such as fluorine, chlorine and bromine. It preferably includes —CH2CH2OH, —CH2CH(CH3)OH, —CH2CH2O-(CH2CH2O)nH, —CH2CH(CH3)O—(CH2CH(CH3)O)mH, in which m and n are an integer of 1 to 20, —CH2CH2OCH3, —CH2COOH, benzyl, phenetyl, CH2CH2Cl and —CH2CH2Br. In the cationic group having the formula (I), two of R1, R2 and R3 and nitrogen atom may form a cyclic group such as pyridyl, imidazolyl, quinolyl, indolyl, pyrrolyl, pyrrolidinyl and piperidyl.

Examples of the ethylenically unsaturated monomer having a lipophilic nature include styrene, an alkyl-substituted styrenes (wherein the alkyl group has 1 to 22 carbon atoms), alkyl (meth)acrylates (wherein the alkyl group has 1 to 22 carbon atoms), fatty acid esters of vinyl alcohol (wherein the fatty acid has 2 to 22 carbon atoms), and N-alkyl(meth)acrylamides (wherein the alkyl group has 1 to 22 carbon atoms).

The oil-soluble cationic copolymer used in the present invention may be prepared by copolymerizing an ethylenically unsaturated monomer having a cationic group represented by the above-described general formula (I) with the above-described ethylenically unsaturated monomer having a lipophilic nature. Alternatively, the oil-soluble cationic copolymer may be prepared by introducing the cationic group after polymerization, e.g., by a method which comprises preparing a copolymer of the above-described monomer having a tertiary amino group with the above-described ethylenically unsaturated monomer having a lipophilic nature and quaternizing the copolymer with the above-described quaternizing agent.

In the present invention, an olefin having 2 to 8 carbon atoms is copolymerized with maleic anhydride by precipitation polymerization in the presence of a dispersant composed of the above-described cationic copolymer having a lipophilic nature.

In the present invention, the cationic copolymer having a lipophilic nature comprises an ethylenically unsaturated monomeric unit having a cationic group represented by the general formula (I) and an ethylenically unsaturated monomeric unit having a lipophilic nature. The molar ratio of these monomeric units is prefeaably 30/70 to 1/99. A copolymer having an ethylenically unsaturated monomeric unit content exceeding 30% by mole is poor in the affinity for the polymerization solvent, while a copolymer having an ethylenically unsaturated monomeric unit content of less than 1% by mole does not exhibit any function as a dispersant. Therefore, neither of them are preferable.

The molecular weight of the oil-soluble cationic copolymer is suitably 500 to 500,000, preferably 5,000 to 200,000. A polymer having a molecular weight of less than 500 or exceeding 500,000 does not satisfactorily function as a dispersant even when the hydrophilic nature and the lipophilic nature of the polymer are balanced.

It is preferred that the above-described cationic copolymer having a lipophilic nature be used in an amount of 0.05 to 20 parts by weight based on 100 parts by weight of maleic anhydride. When its amount is less than 0.05 part by weight, the copolymer does not exhibit any satisfactory effect as a dispersant. On the other hand, when the copolymer is used in an amount of more than 20 parts by weight, it exhibits no particular improvement in the effect thereof as the dispersant and further has an adverse effect on the slump loss preventing capability when the formed olefin-maleic anhydride copolymer particles are used as an admixture of cement. Therefore, neither of them are preferable.

In the present invention, precipitation polymerization is conducted according to an ordinary method in the above-described solvent in the presence of the above-described cationic copolymer having a lipophilic nature and a radical polymerization initiator.

Examples of the radical polymerization initiator include peroxides such as cumene hydroperoxide, tert-butyl hydroperoxide, benzoyl peroxide, diisopropyl peroxycarbonate,llauroyl peroxide, tert-butyl peroxybenzoate, potassium persulfate, and ammonium persulfate and azo initiators such as 2,2'-azobisisobutyronitrile and 2,2'-azobis(2,4-dimethylvaleronitrile). However, the radical polymerization initiator is not limited to these only.

It is preferred that the polymerizatoon initiator be used in an amount of 0.1 to 20% by mole based on maleic anhydride.

The above-described initiator and monomers may be added at once in an early stage of polymerization. Alternatively, they may gradually be added with the progress of the polymerization.

A suitable reaction temperature to select in the polymerization depends on the decomposition temperature of the polymerization initiator used and the boiling point of the solvent used and the polymerization is conducted tt a temperature of usually 30 to 150° C., preferably 40° to 100° C. When the polymerization temperature is too low, the rate of polymerization is lowered. On the other hand, when the polymerization temperature is too high, the formed copolymer tends to deposit on the wall of the reactor and, at the same time, to form a mass.

The polymerization reaction is conducted for to 15 hr. The reaction may be conducted under pressure. Alternatively, the reaction may be conducted under atmospheric pressure by dropping or blowing the olefin having 2 to 8 carbon atoms in the reaction system.

An example of the precipitation polymerization under atmospheric pressure will now be described.

A separable flask equipped with an agitator, a condenser, a thermometer, and a gas inlet is charged with a polymerization solvent, maleic anhydride, a polymerization initiator, and a cationic copolymer having a lipophilic nature according to the present invention. The temperature of the system is raised in a nitrogen atmosphere to a temperature at which the polymerization initiator decomposes. An olefin gas is blown in the system through the gas inlet to allow the gas to dissolve in the solvent, thereby causing polymerization. A predetermined amount of the gas is introduced at that temperature over a period of several hours to form precipitates. The reaction mixture after the reaction is in the form of a slurry containing precipitates of a copolymer. The liquid component is removed by separation means such as filtration or centrifugation. Thereafter, if necessary, the precipitates are washed with a solvent which does not dissolve the copolymer, followed by drying in a vacuum dryer or the like, thereby preparing intended copolymer particles.

The average molecular weight of the olefin-maleic anhydride copolymer prepared by precipitation polymerization according to the present invention is usually about 200,000 or less. In the present invention, the molecular weight of the copolymer may be adjusted by varying the conditions such as the monomer concentration, the amount of the polymerization initiator, and the polymerization temperature. Further, the polymerization may be conducted in the presence of a commonly used chain transfer agent, e.g., sulfur compounds such as lauryl mercaptan or sulfur, nitrogen compounds such as aromatic amines or aliphatic amines, and halogen compounds such as chloroform or carbon tetrachloride.

The dispersant used in the present invention is particularly useful when the olefin-maleic anhydride copolymer is prepared so as to have a molecular weight of about 50,000 or less which tends to cause the disintegration of the particles, the deposition on the wall of the reactor and the lowering in the yield of the copolymer.

Most of the particles prepared by the present invention are primary particles. Therefore, the particles can be applied as such to intended applications. Even when a small degree of agglomeration takes place, e.g., at a high temperature, the agglomerate can be returned to the original primary particles by dispersion in water or very simple pulverization.

The observation of the copolymer of an olefin having 2 to 8 carbon atoms wtth maleic anhydride prepared according to the present invention under an electron microscope revealed that the copolymer particles are spherical in every portion and have a substantially monodisperse particle diameter distribution. Although the size of the prepared particles varied depending upon the kind of the solvent, the kind and amount of the dispersant used, reaction conditions, etc., the particle size was usually 0.1 to 3 μm.

As is apparent from the foregoing detailed description, the preparation of particles of a copolymer of an olefin having 2 to 8 carbon atoms with maleic anhydride by precipitation polymerization in the presence of a particular dispersant enabled the formation of the copolymer in the form of primary particles having a spherical shape and a substantially monodisperse particle diameter distribution without causing the formation of an agglomerate.

Further, the present invention enabled the preparation of the copolymer particles in a high yield without the deposition of the copolymer on the wall of the reactor and the agitating blade. This facilitated the formation of particles of the copolymer having a relatively low molecular weight.

Therefore, the present invention not only enabled a reduction in the cost through an improvement in the yield but also solved the problems on the troublesome step of preparing finely divided particles and the loss of much energy accompanying the conventional pulverization process with respect to the use of the copolymer particles as a slump loss preventive for concrete described before and could impart excellent performance stability to the polymer particles.

Further, with respect to other applications as well, e.g., with respect to a dispersant for pigments, an emulsion stabilizer for emulsion and latex, and a binder for paints and inks, the present invention enabled a remarkable improvement in the workability and the stability of the performance through the facilitation of the dissolution, neutralization, etc.

[EXAMPLES]

The present invention will now be described in more detail with reference to the following Synthesis Examples, Examples of the present invention, and Comparative Examples. However, the present invention is not limited to these Examples only. In the Examples and Comparative Examples, the term "parts" means "parts by weight".

Synthesis Example 1

A 300-ml four-necked flask equipped with an agitator, a reflux condenser, and a nitrogen inlet was charged with 104.2 g (1.0 mol) of styrene, 6.4 g (0.03 mol) of methacryloylethyltrimethylammonium chloride, 11.9 g of toluene, 27.6 g of isopropyl alcohol (IPA), and 1.3 g of 2,2'-azobisisobutyronitrile (hereinafter abbreviated to "AIBN"), followed by mixing and sufficient replacement of the air in the flask with a nitrogen gas. The temperature of the system was raised to 80° C., and a polymerization was conducted at 80° C. for 8 hr. The reaction mixture was diluted with toluene. Thereafter, the polymer solution was subjected to precipitation from a n-hexane/water double-layer solvent system. The precipitates were collected by filtration and then dried to prepare 93.2 g of dispersant A. The nitrogen content of this dispersant was 0.60%. The quaternary salt monomer unit content of the dispersant was found to be 4.7% by mole from the value of the nitrogen content. Further, the number-average molecular weight of the dispersant as determined with GPC was 30000 (in terms of polystyrene).

Synthesis Example 2

The polymerization and the separation of the resulting polymer were conducted using 104.2 g (1.0 mol) of styrene, 14.9 g (0.05 mol) of methacryloylethyltrimethylammonium methosulfate, 29.8 g of acetonitrile, and 1.3 g of AIBN in the same manner as that of Synthesis Example 1, thereby preparing 97.2 g of dispersant B. This dispersant had a nitrogen content of 0.76% and a quaternary salt monomer unit content of 6.3% by mole.

Further, the number-average molecular weight of the dispersant as determined with GPC was 34000 (in terms of polystyrene).

Synthesis Example 3

The polymerization and the separation of the resulting polymer were conducted using 254.1 g (1.0 mol) of lauryl methacrylate, 10.8 g (0.03 mol) of methacryloylethyldimethyloctylammonium bromide 28.7 g of acetonitrile, and 1.3 g of AIBN in the same manner as that of Synthesis Example 1, thereby preparing 89.8 g of dispersant C. This dispersant had a nitrogen content of 0.18% and a quaternary salt monomer unit content of 3.4% by mole. Further, the number-average molecular weight of the dispersant as determined with GPC was 32000 (in terms of polystyrene).

Synthesis Example 4

A mixture of 10.0 g of a styrene-chloromethyl-styrene copolymer (having a chloromethylstyrene content of 2.0% by mole and a number-average molecular weight of 10,000) with 5.0 g of triethylamine and 50 g of tetrahydrofuran was refluxed for 9 hr. The reaction mixture was poured into 1,000 g of methanol. The precipitated insolubles thus obtained were collected by filtration, washed with methanol, and dried in vacuo, thereby preparing 8.7 g of dispersant D having a cationic group

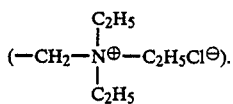

Synthesis Example 5

The polymerization and the separation of the resulting polymer were conducted using 254.1 g (1.0 mol) of lauryl methacrylate, 9.5 g (0.05 mol) of vinylpyridylmethylammonium bromide, 50 g of toluene, and 1.3 g of AIBN in the same manner as that of Synthesis Example 1, thereby preparing 235.1 g of dispersant E. This dispersant had a nitrogen content of 0.25% and a quaternary salt monomer unit content of 4.7% by mole. Further, the number-average molecular weight of the dispersant as determined with GPC was 45000 (in terms of polystyrene).

Example 1

A 1-l separable flask equipped with an agitator, a gas inlet, a thermometer, and a condenser provided with a gas bag at its top was charged with 607 parts of toluene 68.6 parts of maleic anhydride, and 3.4 parts of dispersant A prepared in Synthesis Example 1. The temperature of the system was raised to 70° C. in a nitrogen atmosphere while stirring. 6.8 parts of 2,2'-azobisisobutyronitrile as a polymerization initiator was added thereto, followed by introduction of an isobutylene gas from a separately prepared bomb through the gas inlet into the solution. 45 parts of the isobutylene gas (a molar ratio thereof to maleic anhydride of 1.44) was continuously blown in the system over a period of 3 hr while maintaining the reaction temperature at 70° C. The solution became turbid immediately after the initiation of the introduction of the isobutylene gas thereinto, and the gas bag did not become inflated. From these facts it was found that the gas was efficiently absorbed to cause a polymerization reaction. After the completion of the blowing of the gas, the temperature of the system was maintained at that temperature while stirring for additional 3 hr for maturing, followed by cooling. The reaction mixture in the form of a slurry containing precipitates of the formed polymer was taken out and filtered. The precipitates thus obtained were dried to prepare 106 parts of a white polymer powder. This polymer was a copolymer comprising isobutylene and maleic anhydride in a molar ratio of 1:1, and the yield based on the feed maleic anhydride was as high as 99.6%. The separable flask of which the reaction mixture had been taken out was examined. In the examination, there was observed little or no deposition of the polymer on the internal wall of the reactor and the agitating blade.

The polymer prepared above was dispersed in water and neutralized with NaOH in an amount of an equivalent based on the maleic anhydride unit to prepare a polymer solution. Then, the polymer solution was subjected to determination of the molecular weight of the polymer by gel permeation chromatography. As a result, it was found that the polymer had a weight-average molecular weight of 13,500 (in terms of polysodium styrenesulfonate).

Separately, the polymer powder prepared above was observed under an electron microscope. This revealed that completely spherical monodisperse particles were formed. Further, the polymer powder was dispersed in water to determine the particle diameter and the particle diameter distribution with a light-transmitting centrifugal sedimentation particle size distribution analyzer (Shimadzu SACP-3). In the analysis, a single peak appeared at a position corresponding to a particle diameter of 0.31 μm. From this fact it was found that little or no agglomerate was formed.

Examples 2 to 5

The precipitation polymerization was conducted in the same manner as that of Example 1, except that dispersants B, C, D, and E prepared in Synthesis Examples 2 to 5 were used instead of dispersant A used in Example 1. The yield of the formed isobutylene/mlleic anhydride copolymer powder based on the feed maleic anhydride, the percentage deposition on the wall of the reactor, and the particle diameter were summarized in Table 1.

TABLE 1

| Ex. No. | dispersant | structure of quaternary salt unit in dispersant | yield of isobutylene/maleic anhydride copolymer (%) | percentage deposition on the reactor wall (%) | particle diameter of monodisperse particles (μm) |
|---|---|---|---|---|---|
| 2 | B | $-\overset{\overset{\displaystyle CH_3}{\mid}}{\underset{\underset{\displaystyle CH_3}{\mid}}{N^\oplus}}-CH_3 \cdot CH_3OSO_3^\ominus$ | 98.5 | 0.3 | 0.35 |

TABLE 1-continued

| Ex. No. | dispersant | structure of quaternary salt unit in dispersant | yield of isobutylene/maleic anhydride copolymer (%) | percentage deposition on the reactor wall (%) | particle diameter of monodisperse particles (μm) |
|---|---|---|---|---|---|
| 3 | C | $\begin{array}{c} CH_3 \\ \mid \\ -N^{\oplus}-C_8H_{17}.Br^{\ominus} \\ \mid \\ CH_3 \end{array}$ | 97.4 | 0.1 | 0.53 |
| 4 | D | 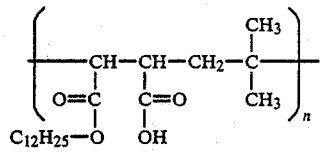 | 96.5 | 0.5 | 0.65 |
| 5 | E | 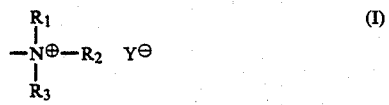 | 99.1 | 0.8 | 0.44 |

Comparative Example 1

The precipitation polymerization of isobutylene with maleic anhydride was conducted in the same manner as that of Example 1, except that dispersant A used in Example 1 was not used here. After the completion of the polymerization, the reaction mixture in the form of a slurry was taken out and filtered, followed by drying, thereby preparing 75.5 parts of a white polymer powder. The yield of the polymer based on the feed maleic anhydride was as low as 71%. The separable flask of which the reaction mixture had been taken out was examined. In the examination, the deposition of a large amount of the polymer on the internal wall of the reactor and the agitating blade was observed. The deposit was scraped off and the weight of the deposit was determined to be 29 parts. The polymer prepared above was subjected to determination of the molecular weight in the same manner as that of Example 1 and found to have a weight-average molecular weight of 12,200. Namely there was no significant difference in the molecular weight between the polymer prepared above and the polymer prepared in Example 1. However, the observation of the polymer prepared above under an electron microscope revealed that no polymer particles were formed and the polymer was in the form of irregular lumps having a size of 20 to 100 μm.

Comparative Example 2

The precipitation polymerization was conducted in the same manner as that of Example 1, except that a half ester of an isobutylene-maleic anhydride copolymer represented by the following formula was used instead of dispersant A used in Example 1:

$$\left(\begin{array}{c} CH_3 \\ \mid \\ -CH-CH-CH_2-C- \\ \mid \quad \mid \quad \quad \mid \\ O=C \quad C=O \quad CH_3 \\ \mid \quad \mid \\ C_{12}H_{25}-O \quad OH \end{array}\right)_n$$

In this case, the amount of the deposition of the polymer on the wall of the reactor and the agitating blade was relatively small and 6.4 parts. However, the observation of the formed polymer under an electron microscope revealed that no polymer particles were formed and the polymer was in the form of irregular lumps having a size of 30 to 100 μm.

We claim:

1. A process for preparing a copolymer of an olefin and maleic anhydride in the form of particles, which comprises co-polymerizing an olefin having 2 to 8 carbon atoms with maleic anhydride in a solvent capable of dissolving both co-monomers, but incapable of dissolving the copolymer in the presence of a dispersant of an oil-soluble, cationic copolymer comprising (a) ethylenically unsaturated monomer units having cationic groups of the formula (I):

$$\begin{array}{c} R_1 \\ \mid \\ -N^{\oplus}-R_2 \quad Y^{\ominus} \\ \mid \\ R_3 \end{array} \quad (I)$$

in which R1, R2 and R3 each are an alkyl having 1 to 22 carbon atoms or a substituted alkyl having 1 to 22 carbon atoms or two of R1, R2 and R3 form a cyclic structure in combination with the nitrogen atom and Y is a halogen or an acid residue, and (b) lipophilic, ethylenically unsaturated monomer units.

2. A process as claimed in claim 1, in which the dispersant copolymer comprises the (a) units and (b) units at a mole ratio ranging from 30/70 to 1/99.

3. A process as claimed in claim 1, in which the dispersant is used in an amount of 0.05 to 20 parts by weight based on 100 parts by weight of maleic anhydride.

* * * * *